United States Patent [19]

Roza et al.

[11] Patent Number: 4,654,843

[45] Date of Patent: Mar. 31, 1987

[54] SIGNAL DISTRIBUTION SYSTEM

[75] Inventors: Engel Roza; Hendrik G. van Veenendaal, both of Eindhoven, Netherlands

[73] Assignee: U.S. Philips Corporation, New York, N.Y.

[21] Appl. No.: 531,545

[22] Filed: Sep. 12, 1983

[30] Foreign Application Priority Data

Sep. 17, 1982 [NL] Netherlands ................. 8203600

[51] Int. Cl.[4] .......................... H04J 1/02; H04L 5/12
[52] U.S. Cl. ....................................... 370/20; 370/71; 370/73; 375/39
[58] Field of Search ............... 370/20, 71, 73, 74, 370/124, 19; 381/5; 375/39; 358/86, 142; 455/3, 4, 5

[56] References Cited

U.S. PATENT DOCUMENTS

| | | | |
|---|---|---|---|
| 3,588,702 | 6/1971 | Tisi et al. | 375/39 |
| 3,818,347 | 6/1974 | Holsinger | 375/39 |
| 3,963,872 | 6/1976 | Hagstrom et al. | |
| 3,985,964 | 10/1976 | Ohukubo et al. | 381/5 |
| 4,034,305 | 7/1977 | Sato | 375/39 |
| 4,200,881 | 4/1980 | Carnt et al. | 358/16 |
| 4,286,283 | 8/1981 | Clemens | 358/11 |
| 4,382,266 | 5/1983 | Panzer | 358/86 |
| 4,398,216 | 8/1983 | Field et al. | 370/20 |
| 4,410,911 | 10/1983 | Field et al. | 370/20 |
| 4,458,356 | 7/1984 | Toy | 375/39 |
| 4,513,315 | 4/1985 | Dekker et al. | 358/86 |

OTHER PUBLICATIONS

Ritchie, W. K., "Multi-Service Cable-Television Distribution Systems", *British Telecommunications Engineering*, vol. 1, Jan., 1983.

Schrock, C. B., "Proposal for a Hub Controlled Cable Television System Using Optical Fiber", *IEEE Transactions on Cable Television*, V, CATV-4, M No. 2, Apr. 1979.

*Primary Examiner*—Robert L. Griffin
*Assistant Examiner*—Wellington Chin
*Attorney, Agent, or Firm*—Thomas A. Briody; Jack Oisher; William J. Streeter

[57] ABSTRACT

A head-end for a signal distribution system with selection facility, includes a matrix (8) and a multiplexer (12) connected thereto for forming a multiplex signal. The head-end further comprises A/D converters (4-1 to Δ-N) for converting the wide-band input signals into digital signals prior to supply to the matrix. The multiplexer comprises two amplitude modulators (13, 14) for the mutual quadrature amplitude modulation of a carrier (17) by two digital signals, and a summing means (18) for adding a digital signal in the base band to the modulated signal. A signal receiver for one of the modulated signals comprises a synchronous amplitude demodulator (21) connected to a synchronized carrier source (20) and also comprises means for digital-to-analog conversion (24).

4 Claims, 3 Drawing Figures

SIGNAL DISTRIBUTION SYSTEM

BACKGROUND OF THE INVENTION

The invention relates to a head end for a signal distribution system, comprising a space division switching network for selectively switching wide-band input signals to a plurality of outputs, to which a multiplexing arrangement is connected for forming at an output thereof a composite signal which is thereafter used for the signal distribution.

The invention also relates to a receiver suitable for processing the composite signal generated by the head-end of the distribution system, the receiver comprising a demultiplexing arrangement for deriving at least one wide-band signal from the composite signal.

Such a head-end and such a receiver for a signal distribution system are inter alia used in combination with light transmission through optical fibres. The signal-to-noise ratio of an optical transmission path is such that in practice, it is usually preferable to use digital modulation methods having a small number of modulating levels. In addition, in the space division switching network (matrix), cross-talk occurs between the different signals. This cross-talk can be counteracted by re-clocking the digital signal streams after switching by the matrix. This, however, can only be achieved in a simple way with mutually synchronous digital signal streams.

Mutually synchronous digital signal streams can be time-division mutliplexed, as a result of which a digital signal stream having a high bit rate is produced. In practice, this bit rate may easily exceed the capacity of the transmission channel for the transmission of television video signals. Thus, the bandwidth - distance characteristic number for a graded-index fibre is at present approximately 700 MHz.Km. For subscribers lines having a length of 5 Km, such as occur in the telephony network, this results in a bandwidth of approximately 140 MHz. A time-division-multiplex of more than two digital television-video signals therefore would not fit in this frequency band.

SUMMARY OF THE INVENTION

An object of the invention is to enable the provision of a head-end for a signal distribution system of the above-described type for the transmission of several wide-band signals in digital form, which need not be mutually synchronized, in a comparatively narrow frequency band. A further object of the invention is to enable the provision of a receiver for recovering at least one of the wide-band signals.

The invention provides a head end for a signal distribution system as set forth in the opening paragraph characterized in that the wide-band input signals are encoded, prior to their supply to the space-division switching network, into a plurality of parallel mutualy asynchronous digital signal streams and that the multiplexing arrangement comprises means for the mutual quadrature amplitude modulation of a carrier by two digital signal streams and means for adding in the baseband a third digital signal stream to the quadrature modulated signals for forming the composite signal for the signal distribution.

The invention further provides, a receiver as set forth in the second paragraph, characterized in that the demultiplexing arrangement comprises at least one synchronous amplitude demodulator connected to a local synchronized carrier source for frequency and phase-synchronous demodulating at least one of the quadrature modulated signals for the recovery of one of the digital signal streams and means for the digital-to-analog conversion of the recovered digital signal stream.

DESCRIPTION OF THE DRAWINGS

Embodiments of the invention will now be described, by way of example, with reference to the accompanying drawings, in which.

DESCRIPTION OF THE PREFERRED EMBODIMENT

Figure 1:
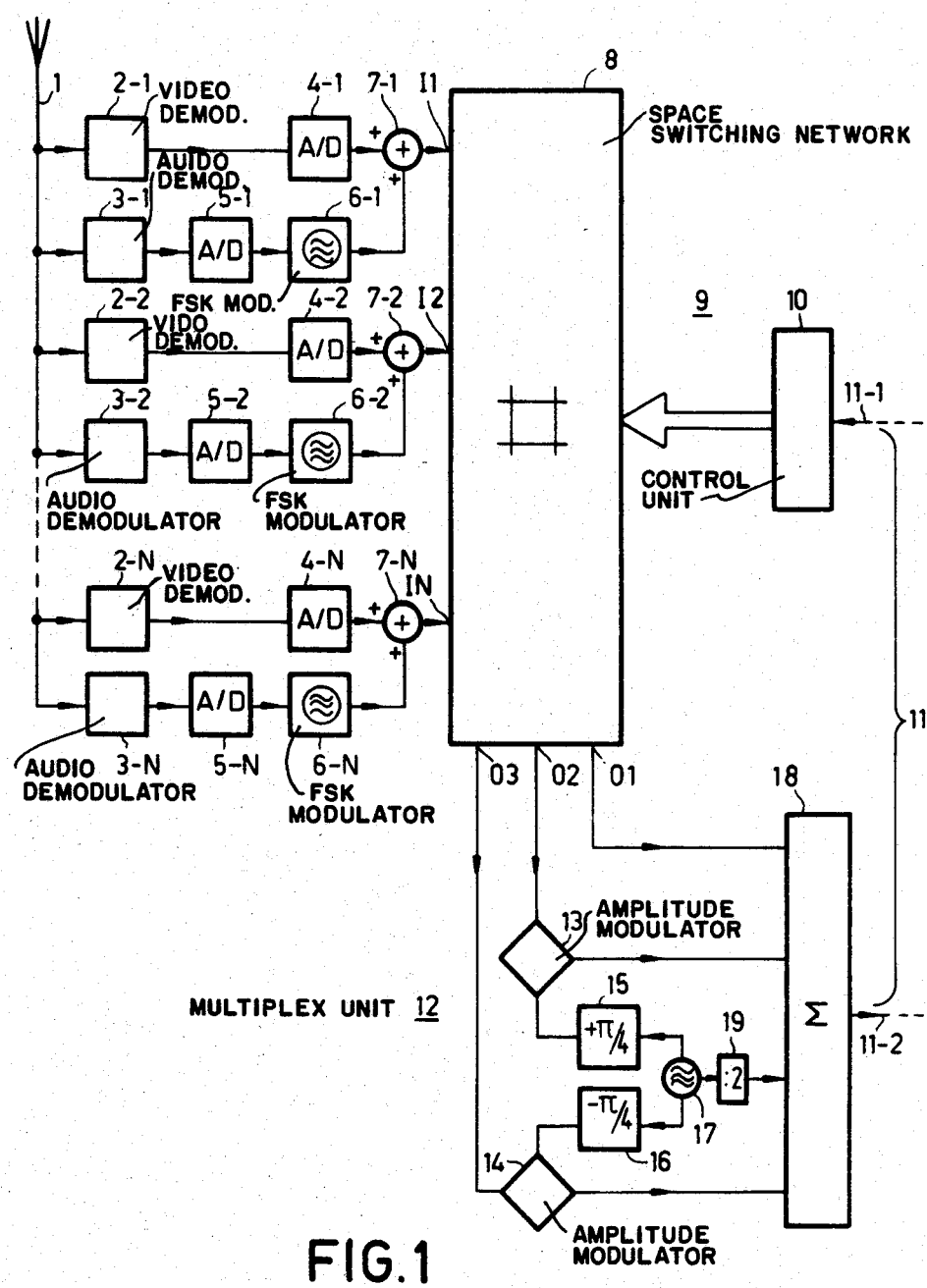
FIG. 1 shows a block schematic diagram of a head-end for a signal distribution system in accordance with the invention.

The head-end for a signal distribution system shown in FIG. 1, which may, for example, be used to distribute several television signals, comprises a set of demodulators 2-1, 2-2, . . . 2-N for several (N) video signals and a set of demodulators 3-1, 3-2, . . . 3-N for several (N) associated sound signals connected to a receive aerial 1.

The video signals are converted into digital signals by means of a plurality of analog-to-digital converters (A/D converters) 4-1, 4-2, . . . 4-N. In the example described here, these A/D converters are ternary-delta-modulators having a symbol rate of 70 MBaud, whose frequency band does not extend to further than 42 MHz. Its frequency spectrum is illustrated by the curve V1 in FIG. 2.

The sound signals are converted into digital signals by means of a plurality of A/D converters 5-1, 5-2, . . . 5-N. In this example these A/D-converters produce binary output signals at a bit rate of 2 Mbit/sec. These output signals are FSK-modulated in a plurality of FSK-Modulators 6-1, 6-2, . . . 6-N on a carrier having a carrier frequency of 45 MHz. The spectrum of the modulated signal is illustrated by curve S1 in FIG. 2.

The FSK-modulated signals are added to the associated digital video signal in a plurality of summing means 7-1, 7-2, . . . 7-N. The sum signals are applied to inputs I1, I2, . . . IN of a space-division switching network 8 (matrix), which forms part of a subscriber unit 9. The subscriber unit 9 further comprises a control unit 10 for controlling the matrix 8, which control unit is connected to the incoming channel 11-1 of a transmission path 11 for receiving the control information. Under the control of the control unit 10, matrix 8 establishes selected connections between the inputs I1, I2, .....IN and three outputs 01, 02 and 03.

In this manner three arbitrary television signals can be applied to a multiplexing unit 12, which is also part of the subscribers unit 9.

The multiplexing unit 12 comprises two modulators 13 and 14 which produce amplitude modulated signals with a suppressed carrier. The modulators 13 and 14 are connected, via the phase shifters 15 and 16, which have a mutual phase shift of 90°, to a carrier source 17, having, in this example, a carrier frequency of 100 MHz. The output signal from output 02 is applied to modulator 13 and the output signal from output 03 to modulator 14, the two signals being mutually quadrature-amplitude modulated on the 100 MHz carrier by these modulators.

Figure 2:
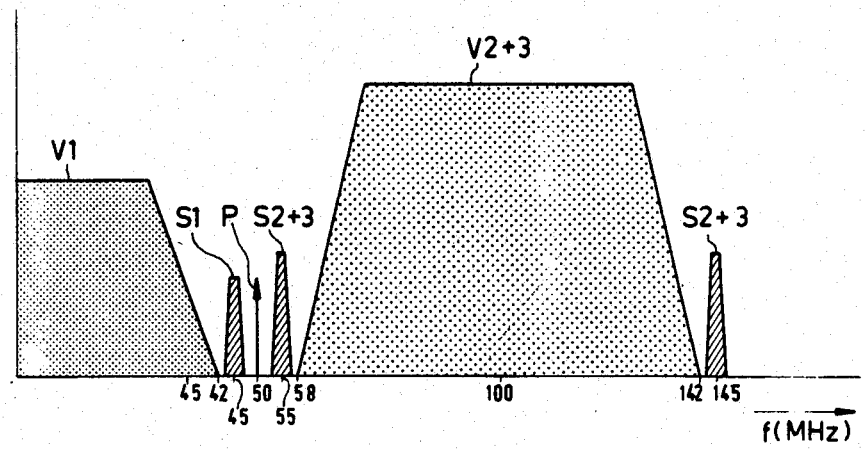
FIG. 2 is an illustration of the frequency spectrum of the composite output signal of the head-end shown in FIG. 1.

The signal from output 01 and the output signals of the modulators 13 and 14 are combined in a summing means 18 into a composite signal which is applied to the outgoing channel 11-2 of the transmission path 11. The spectrum of the composite signal is illustrated in FIG. 2. In this Figure the curve V2+3 illustrates the frequency position (after modulation) of the video signals received from the outputs 02 and 03. The specrum, having an upper and a lower sideband, of the associated sound signals is shown at S2+3. The frequencies of the digital video signal and the FSK-modulated sound signal from output 01 are not shifted and their spectra are again illustrated by V1 and S1.

By way of illustration of a practical embodiment, in which a transmission path 11 with light transmission through an optical fibre is used, the following additional information can be given with reference to FIG. 2.

The level of the video signal V1 is approximately 6dB below the level of the modulated video signals V2+3. The level of the sound signal is approximately 12 dB below the level of he associated video signal. At the frequency of 50 MHz, a pilot signal P is conveyed along with the other signals with a level which is approximately 20 dB below the level of the total composite signal P. The pilot signal is derived from the carrier source 17 by means of a divide-by-two divider 19 and applied to the summing means 18 for conveyance to the outgoing channel 11-2.

The matrix 8 is an analog space-division network in which the signals are switched-through in the analog form. During this switching-through operation, a certain degree of cross-talk occurs between the different signals. By digitally encoding the signals at the input side of the matrix 8, the cross-talk can be effectively counteracted by signal regeneration at the receiving side of the distribution system.

Figure 3:
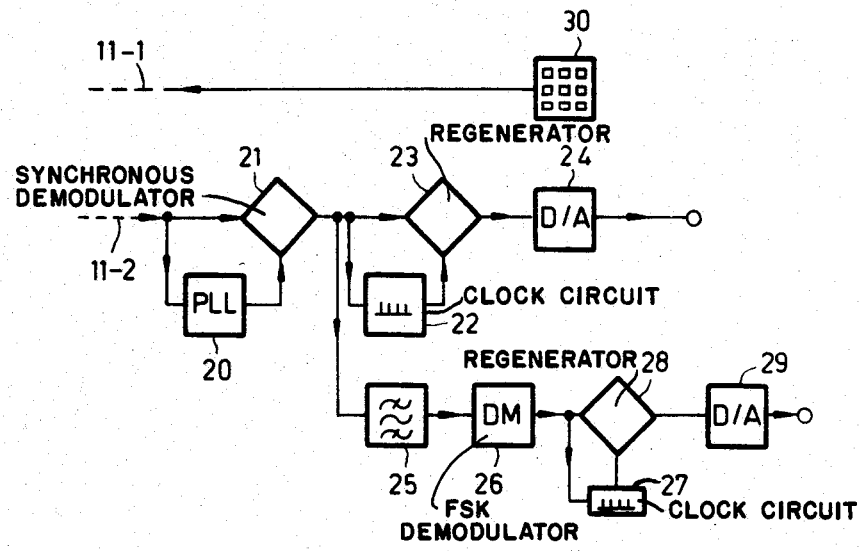
FIG. 3 shows a block schematic diagram of a receiver in accordance with the invention.

A receiver for one of the modulated signals from the composite signal of FIG. 2 is shown in FIG. 3. It comprises a phase-locked loop (PLL) 20, which generates a synchronous 100 MHz carrier from the 50 MHz pilot. A synchronous amplitude demodulator 21 is connected to this phase-locked loop 20 for frequency and phase-synchronous demodulating one of the quadrature modulated signals V2, S2, and V3, S3, respectively. A simple phase adjustment of the local carrier to be effected for each of the two possible types of receiver determines which of the two modulated signals will be demodulated.

The output signal of demodulator 21 is applied to a clock extraction circuit 22 and to a regenerator 23 connected thereto. From the digital video signal, the clock extraction circuit 22 derives a clock signal having a repetition frequency of 70 MHz for the regeneration of the digital video signal by regenerator 23. The regenerated digital video signal is thereafter applied to a digital-to-analog converter 24 (D/A-converter) for reproducing the analog video signal.

The sound component of the output signal of demodulator 21 is applied to the FSK-demodulator (DM) 26 via bandpass filter 25 which is tuned to the sound carrier frequency of 45 MHz. The demodulated digital sound signal is applied to a clock extraction circuit 27 and to a regenerator 28 connected thereto. From the digital sound signal, the clock extraction circuit 27 derives a clock signal having a clock repetition frequency of 2 MHz for the regeneration of the digital sound signal. This sound signal is thereafter applied to the D/A-converter 29 for reproducing the analog sound signal.

The signal regenerators 23 and 28 eliminate any cross-talk occuring between the signals in the matrix 8, while, because of the transmission of the signals on the one hand in the base band and on the other hand by means of quadrature amplitude modulation, it is not necessary to maintain synchronism between the signals.

It will be obvious that a receiver for the signals V1 and S1 can do without the synchronous demodulator 21 and PLL 20.

FIG. 3 further shows a selection arrangement 30 connected to the outgoing channel 11-1 for applying programm selection information to the control unit 10 of the subscribers unit 9. On the basis of this information, the control unit 10 establishes a connection through the matrix 8 from the selected input I1, . . . IN to the output 01, 02 or 03 which is associated with the receiver transmitting the selection information.

What is claimed is:

1. A head-end signal distribution system comprising:
   means for encoding a plurality of wideband input signals into a plurality of mutually asynchronous digital signal streams;
   a space switching network for selectively switching said plurality of mutually asynchronous digital signal streams to a plurality of at least three output terminals;
   multiplexing means for combining signals from said at least three output terminals into a composite signal comprising:
   modulating means for amplitude modulating two of said terminal output signals on first and second carrier signals of the same frequency and differing in phase by 90°; and
   summing means for combining a remaining output terminal signal from said space switching network with said first and second modulated carrier signals to form a single composite signal for distribution.

2. The head-end signal distribution of claim 6 further comprising:
   means for supplying a reference signal for demodulating said modulated carrier signals to said summing means.

3. The head-end signal distribution system of claim 1 wherein said means for encoding a plurality of wideband input signals comprises:
   a demodulation means for supplying a plurality of analog video signals and an associated audio signal for each of said video signals;
   means for converting each analog video signal to a digital video signal;
   means for converting each analog audio signal to a digital audio signal;
   means for modulating each digital audio signal on a subcarrier; and
   means for combining each digital video signal with an associated digital audio signal modulated on a subcarrier, whereby a plurality of mutually asynchronous digital signal streams are formed.

4. A receiver for processing a composite signal, said composite signal including first and second quadrature carrier signals modulated with space-switched asynchronous digital data streams, and including a baseband asynchronous digital signal stream, as well as a reference signal for demodulating said carrier signals, each of said quadrature carrier signals and baseband asynchronous digital signals including a digital video signal, and an associated digital audio signal FSK modulated on a subcarrier signal, comprising:

- a synchronous amplitude demodulator connected to receive said composite signal and to receive a local carrier signal synchronized with said reference signal, said demodulator providing one of said digital asynchronous data streams from one of said carrier signals;
- a clock extraction circuit connected to said synchronous amplitude demodulator to generate a video clock signal for generating a video signal from said digital asynchronous data stream;
- a regenerator connected to receive said video clock signal and a signal from said synchronous amplitude demodulator for producing a demodulated digital video signal;
- digital to analog converter connected to receive said digital video signal from said regenerator whereby an analog video signal is produced;
- an FSK demodulator connected to said synchronous amplitude demodulator for removing a digital audio signal from a subcarrier signal contained in said composite signal;
- an audio clock signal regenerator for generating an audio clock signal from said digital audio signal; and
- audio regeneration means receiving said audio clock signal and a signal from said FSK demodulator for generating said digital audio signal, and a second digital to analog converter means for converting said digital audio signal from said audio regeneration means into an analog audio signal.

* * * * *